(12) United States Patent
Steury et al.

(10) Patent No.: US 7,672,881 B2
(45) Date of Patent: *Mar. 2, 2010

(54) FEE ALLOCATOR SYSTEM AND METHOD

(75) Inventors: Lisa Steury, Hoboken, NJ (US); John Berkley, Evanston, IL (US); Frank Scarpaci, San Diego, CA (US); Corinna Cooke, Centereach, NY (US); Bill Rozenwaser, Scottsdale, AZ (US); Corbett Bloom, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/767,881

(22) Filed: Jun. 25, 2007

(65) Prior Publication Data

US 2007/0250357 A1    Oct. 25, 2007

Related U.S. Application Data

(62) Division of application No. 09/904,965, filed on Jul. 13, 2001, now Pat. No. 7,395,231.

(60) Provisional application No. 60/218,445, filed on Jul. 14, 2000.

(51) Int. Cl.
*G07F 19/00* (2006.01)
*H04M 15/00* (2006.01)
*G06Q 10/00* (2006.01)
*G06Q 30/00* (2006.01)
*G06F 11/34* (2006.01)
*H04M 3/51* (2006.01)

(52) U.S. Cl. .............................. 705/34; 705/1.1; 705/5; 705/11

(58) Field of Classification Search .................. None
See application file for complete search history.

(56) References Cited

U.S. PATENT DOCUMENTS 4,970,655 A     11/1990   Winn et al.

(Continued)

FOREIGN PATENT DOCUMENTS

WO         WO0207047        1/2002

OTHER PUBLICATIONS

Notice of Allowance mailed Mar. 27, 2008 in U.S. Appl. No. 09/904,965.

*Primary Examiner*—F. Ryan Zeender
*Assistant Examiner*—Asfand M Sheikh
(74) *Attorney, Agent, or Firm*—Snell & Wilmer L.L.P.

(57) ABSTRACT

A system is provided for automatically billing a designated account for fees associated with the costs of tickets and other similar services. Passenger Record Number data and similar data is provided through a Computerized Reservation System and an accounting system to a Fee Allocator program which automatically interprets the data, determines appropriate fees based on the data and a user profile, and bills the fees to an appropriate account based on the user profile. Billing data provided to the account also facilitates the process of reconciling the fees to the travel ticket costs. Enhanced descriptive billing statements can be created simplifying the process of reconciling fees to the travel ticket costs.

17 Claims, 18 Drawing Sheets

U.S. PATENT DOCUMENTS

| | | |
|---|---|---|
| 5,237,499 A | 8/1993 | Garback |
| 5,239,480 A | 8/1993 | Huegel |
| 5,634,012 A | 5/1997 | Stefik et al. |
| 5,644,721 A | 7/1997 | Chung et al. |
| 5,742,845 A | 4/1998 | Wagner |
| 5,774,870 A | 6/1998 | Storey |
| 5,832,451 A | 11/1998 | Flake et al. |
| 5,832,453 A * | 11/1998 | O'Brien .......................... 705/6 |
| 5,832,454 A | 11/1998 | Jafri et al. |
| 5,832,457 A | 11/1998 | O'Brien et al. |
| 5,842,176 A | 11/1998 | Hunt et al. |
| 5,864,818 A | 1/1999 | Feldman |
| 5,897,620 A | 4/1999 | Walker et al. |
| 5,898,838 A | 4/1999 | Wagner |
| 5,905,736 A | 5/1999 | Ronen et al. |
| 5,905,908 A | 5/1999 | Wagner |
| 5,948,040 A | 9/1999 | DeLorme et al. |
| 5,987,429 A | 11/1999 | Maritzen et al. |
| 6,006,251 A | 12/1999 | Toyouchi et al. |
| 6,009,408 A | 12/1999 | Buchanan |
| 6,009,412 A | 12/1999 | Storey |
| 6,023,679 A | 2/2000 | Acebo et al. |
| 6,122,642 A | 9/2000 | Mehovic |
| 6,240,396 B1 | 5/2001 | Walker et al. |
| 6,360,205 B1 | 3/2002 | Iyengar et al. |
| 6,360,209 B1 | 3/2002 | Loeb et al. |
| 6,404,884 B1 | 6/2002 | Marwell et al. |
| 6,442,526 B1 | 8/2002 | Vance et al. |
| 6,477,503 B1 | 11/2002 | Mankes |
| 6,609,658 B1 | 8/2003 | Sehr |
| 6,668,055 B2 | 12/2003 | Marwell et al. |
| 6,741,969 B1 | 5/2004 | Chen et al. |
| 6,980,962 B1 | 12/2005 | Arganbright et al. |
| 2002/0006787 A1 | 1/2002 | Darby |
| 2002/0026336 A1 | 2/2002 | Eizenburg et al. |
| 2002/0042715 A1 | 4/2002 | Kelley |
| 2002/0077871 A1 | 6/2002 | Udelhoven et al. |
| 2002/0178034 A1 | 11/2002 | Gardner et al. |
| 2003/0040987 A1 | 2/2003 | Hudson et al. |
| 2003/0115141 A1 | 6/2003 | Felix et al. |
| 2003/0158910 A1 | 8/2003 | Toyouchi et al. |
| 2004/0220854 A1 | 11/2004 | Postrel |

* cited by examiner

Statement of Account
   Please Submit All Outstanding Expenses

| Corporate Account Number | Statement Closing Date | Total Amount Due |
|---|---|---|
| 3785-0123450-91006 | 11-01-99 | $9,258.40 |

John Doe                          Mail Payment To:
Large Corporation                 American Express
123 Any Street                    Suite 0001
Phoenix AZ 85027-2411             Chicago IL 60679-0001

850939094 009258400000012600

Summary of Account
Corporate Cardmember Name   Corporate Account Number   Statement Closing Date
        John Doe                3785-0123450-91006            11-01-99

| Previous Balance | New Charges | Other Debits | Payments Recieved | Other Credits |
|---|---|---|---|---|
| $9,858.35 | $11,412.60 | $0.00 | $9,858.38 | $2,154.17 |

340

Balance Due
$9,258.40

| Ref. Num. | Item Num. | Description of Monthly Activity | Charges | Credits |
|---|---|---|---|---|
|  |  | Previous Balance | $9,858.35 |  |
| 835278 |  | Payment Recieved - Thank You 10/05 |  | 3,273.28 |
| 835301 |  | Payment Recieved - Thank You 10/28 |  | 6,585.10 |
| 501280 | 1 | Park Savoy Hotel New York 12282809 Lodging NY 10/06/99 | 175.00 |  |
| 700274 | 2 | Delta Airlines New York TKT#0067676805968 Airline NY 10/17/99 | 405.93 |  |
| 601199 | 3 | Delta Airlines New York TKT#0067676805969 Airline NY 10/25/99 | 400.00 |  |
| 301200 |  | American Express Paper Ticket Fee ∿322  Doe/John TKT#0067676805969 ∿324  PHX/NYC/PHX 10/25/99 ∿328 | 40.00 ∿332 |  |
| 301210 |  | American Express Ticket Refund Fee Doe/John TKT#0067676805968 PHX/NYC/PHX 10/17/99 | 40.00 |  |

326  330

310 { (rows 301200)
320 { (row 301210)

Page 1 of 5

FIG. 3

Airline Billing Account
Statement for
Grande Co.
Jane Doe -ABA

Jane Doe -ABA
Grande Co.
123 North First Ave.
Phoenix AZ 85027

Summary of Account

Your Account Is One Month Overdue.
If Payment In Mail - Thank You.

Account Number 3787-456780-71007
Please Enter This Account Number
On All Checks And Correspondence

| | | |
|---|---|---|
| Previous Balance | $ | 30,794.49 |
| New Charges | $ | 10,697.01 |
| Other Debits | $ | 0.00 |
| Payments | $ | 23,875.90- |
| Other Credits | $ | 400.00- |
| New Balance | $ | 17,215.60 |

410

Billing Date  11/07/99
Any Payment Or Charge Recieved
After 12/01/00 Will Appear Next Month Amount Due  $17,215.60
Payable Upon Receipt In U.S. Dollars

FIG. 4A

*Airline Billing Account*
*Statement for*
*Grande Co.*
*Jane Doe -ABA*

Date 11/07/99
Page: 1
CC1133

Account Number 3787-456780-71007

| PSGR-Name | | | | | | | | | | |
|---|---|---|---|---|---|---|---|---|---|---|
| PSGR-Name | | | 442 | 448 450 | 452 | 454 455 | 458 456 | | 420 | |
| Passenger Name | | | 444 | | DEP | INV# | Ticket# | AMEX REF# | Trans Amount | |
| Object Fund Activity | TU Routing | | CL | A/L | Date | INV Date | | | | |
| 446 | | | | | | | | | | |
| Amber/John | | | | | | | | | | |
| 0000-000000-000000-0000 27 | Boston MA-Washington | | Y | DL | 10/28/99 | 39671 | 0067676805840 | | 334.50 | |
| | Washington-Boston MA | | Y | DL | | 10/14/99 | 288 669 | | | |
| 0000-000000-000000-0000 | American Express Paper Ticket Fee ———A | | | | | | | | 40.00 | 430 |
| | Boston MA-Washington | | Y | DL | 10/28/99 | 39671 | 0067676805840 | | | |
| | Washington-Boston MA | | Y | DL | | 10/14/99 | 287 301 | | | |
| PSGR-Name | | | | | | | | | | |
| Blue/Lew | | | | | | | | | | |
| 0000-000000-000000-0000 00 | Boston MA-Buffalo NY | | Y | US | 10/13/99 | 39024 | 0377676805167 | | 570.85 | |
| | Buffalo NY-Philadelphia | | Y | US | | 10/08/99 | 282 669 | | | |
| | Philadelph-Boston MA | | Y | US | | | | | | |

| Account Number 3787-456780-71007 | | Business Travel Account - BTA | | CC-1348 |
|---|---|---|---|---|
| | | Christine Green - BTA | | Page 4 |
| Statement Date | Sorted by Ticket Number | Orion MGT Co. | | |
| 12/25/99 | Within Passenger Name | 123 Red St SW | | |
| | Within Account Number | Phoenix, AZ 85027 | All Other Transactions 510 | |
| | | Charges, Debit Adjustments, Payments and Credits | | |
| Account Number | Notes | Description | Amount | Notes |
| Account Name | For Your Records | | | to AMEX |
| 3782-987657-01000 Christine Green-BTA | | | | |
| 3785-076543-01002 Amy Amber | 520 { | American Express Ticket Refund Fee Amber/Amy TKT# 03776657744416 BOS/NYC/BOS 11/29/99 | 40.00 | |
| | | Other Charges Total | 40.00 | |
| 3785-084321-01004 Bobby Blue | 530 { | American Express Ticket Refund Fee Blue/Bobby TKT# 0377671544337 BOS/NYC/BOS 11/29/99 | 40.00 | |
| | | American Express Paper Ticket Fee Blue/Bobby TKT# 0067686069241 BOS/NYC/BOS 11/30/99 | 40.00 | |
| | | American Express Paper Ticket Fee Blue/Bobby TKT# 0067690352144 BOS/NYC/BOS 12/07/99 | 540 { 40.00 | |
| | | Other Charges Total | 120.00 | |

FIG. 5

|  |  | Invoice/Itinerary |
|---|---|---|
| Sales Person: P2 | Itinerary/Invoice No. 0055781 | Date: 09 Feb 00 |
| Customer NBR: 0000401710 | Duplicate VNGSCB | Page: 01 |
| To Pam Pollaro<br>Rexmart Corporation<br>84 Pratt Street<br>Hartford, CT 06103<br>DEL 09FEB | | For: Pollaro/Pamela Ref: 987654-045529300 |

| Air<br>23 Mar<br>Thu | LV Hartford Springfld | 1112A | United Airlines | 1905H<br>04Hr 02 Min |
|---|---|---|---|---|
| | AR Atlanta | 314P | 1-stop | Eqp: Boeing 737-20<br>Ref: RNQ4C2 |
| | Pollaro/Pamela<br>Via Washington Dulles | Seat | 4A UA-00173065752 | |
| Air<br>25 Mar<br>Sat | LV Atlanta | 245P | United Airlines | 1968H<br>03Hr 51 Min |
| | AR Hartford Springfld | 636A | 1-stop | Eqp: Boeing 737-20<br>Ref: RNQ4C2 |
| | Pollaro/Pamela<br>Via Washington Dulles | Seat | 4F UA-11173065752 | |

As per our agreement with your company you have been charged a non-refundable travel service fee of $XX.00. A travel service fee of $XX.00 will be charged for refunded tickets. For assistance during normal business hours 8A-8P call 949-553-0000
For after hours emergency assistance call
1-800-847-0242 - access code - S-4HC2
Please retain your passenger receipt for expenses.
All passengers over the age of 18 must show ID upon check in. The name on the ID must match the name on the airline ticket.
Air Ticket UA7762275377
ELEC TKT

| | |
|---|---|
| Pollaro Pamela | |
| Billed to American Express | 478.00 |
| Sub Total | 478.00 |
| Net CC Billing | 478.00* |
| Total Amount Due | 0.00 |

FIG. 6A

|  |  | Invoice/Itinerary |
|---|---|---|
| American Express<br>200 Pinacle Way<br>Norcross GA 30092 | American Express<br>Field Training / STE 301<br>P Pollaro / 806-987-5516<br>64 Pratt St<br>Hartford CT 06103 | Page No. 1<br>PNR: IP-LWODRC |

For: Pollaro/Pamela

```
           229384-0455293  6123000004                    10Feb00

A Th 23Mar   LV Hartford        1112A   United   1905H OK   1-Stop 737
             AR Atlanta         314P
             Via Washington A Sa 25Mar   LV Atlanta         245P    United   1968H OK   1-Stop 737
             AR Hartford        636P
             Via Washington Ticket Number(s)  006152861958

Air Fare           429.76
                                         Tax                 48.24
                                         Total Air Fare     478.00
                                         Amount Charged     478.00
```

This amount will be charged to credit card AX

As per our agreement with your company you have
been charged a non-refundable travel service fee of
$50.00. A travel service fee of $XX.00 will be
charged for refunded tickets. For assistance during
normal business hours 8A-8P call 949-553-0000
For after hours emergency assistance call
1-800-847-0242 - access code - W-B4F
Please return all unused non-refundable tickets to
your internal accounting department.
All passengers over the age of 18 must show ID upon
check in. The name on the ID must match the name
on the airline ticket.
                  Thank You For Your Business

FIG. 6B

|  |  |
|---|---|
| Rexport Corporation<br>123Main St<br>Knowvillc CT 06039 | Invoice/Itinerary<br>Page No. 1<br>Feb 09 2000 Invoice: 51650 |
| Pollaro/Pam*K5V000000-0000 | RLM4BW 00 17713 |

23 Mar 00 - Thursday
    Delta 1255 Coach Class    Equip-Boeing 767-300
    LV Hartford 800A    Nonstop Miles- 859    Confirmed
    AR Atlanta 1035A    Journey Time- 2:35
    Snack 25 Mar 00 - Saturday
    Delta 1242 Coach Class    Equip-Boeing 767 Jet
    LV Atlanta 835A    Nonstop Miles- 859    Confirmed
    AR Hartford 1054A    Journey Time- 2:19
    Snack As per our agreement with your company you have
been charged a non-refundable travel service fee of
$50.00. A travel service fee of $XX.00 will be
charged for refunded tickets.
Ticket numbers/S
Pollaro/Pam    1596069382    Card Electronic    473.00

Air Transportation    429.76    Tax 43.24    TTL    473.00
    Sub Total    473.00
    Credit Card Payment    473.00-
    Amount Due    0.00

FIG. 6C

FEE ALLOCATOR SYSTEM AND METHOD

REFERENCE TO RELATED DOCUMENTS

This application is a divisional of and claims priority to U.S. patent Ser. No. 09/904,965 filed on Jul. 13, 2001 and entitled "FEE ALLOCATOR SYSTEM AND METHOD", which application claims the benefit of, and priority to, U.S. Provisional Application Ser. No. 60/218,445, filed Jul. 14, 2000, both of which are hereby incorporated by reference in their entirety.

BACKGROUND OF THE INVENTION

1. Technical Field

The present invention relates generally to transaction fees and transaction card billing and, more particularly, to the creation of an automated allocation tool that disburses travel related transaction fees to specific corporate cost centers, and provides an enhanced descriptive billing statement separately identifying transaction fees and related travel charges such that the purchaser can easily reconcile the transaction fees to the related travel charges.

2. Background Information

Transaction fees are commonly provided to agents for value added by the agents when selling certain goods or services. Transaction fees are more common where an agent acts as a broker of products or serves as a "middle-man". For example, ticket outlets often sell tickets for a variety of venues and events such as: sporting events, concerts, plays, etc. Generally, in addition to the cost of the entertainment, a transaction fee is additionally charged to reimburse the ticket broker for its services. Another example includes travel agencies which broker travel-related services, wherein the travel-related services include, but are not limited to: assisting in providing tickets through traditional and interactive bookings for air/rail/boat/bus travel, providing paper tickets or e-tickets, canceling tickets, processing refunds and exchanges on tickets, reserving rental cars, reserving hotel rooms, and providing other value-added services such as ticket tracking, emergency travel services, travelers cheques, group travel services, international rate desks, executive travel and concierge services. In this context, travel-related services are often grouped into two groups, namely, arranging services to be provided by others, and services provided directly by the travel agency. Another example of a travel related service is the system disclosed in U.S. patent application Ser. No. 09/346,085 filed on Jul. 1, 1999 and entitled "Ticket Tracking And Refunding System And Method", which is hereby incorporated by reference.

In the past, travel agencies often did not charge a transaction fee associated with the services provided by others. One of the reasons that travel agencies were able to be profitable without charging fees for arranging services to be provided by others is that the airlines and other service providers typically offered overrides, commissions or incentives to reward the travel agency for the added business.

In addition to travel agencies, an in-house travel department may act as a travel agency within a corporation or business providing similar services to people within their organization who have travel-related needs. Alternatively, an in-house travel department may coordinate travel issues with an outside travel agency. In either case, in-house travel departments in the past similarly found that overrides and commissions made it possible to operate the corporate travel departments as profit centers; thus eliminating the need to charge the individual departments or travelers within their organization for the costs associated with making the travel arrangements.

Beginning in approximately 1995, airlines and other service providers made substantial cuts in the commissions, incentives, and overrides mentioned above by reducing them in half, and in other instances eliminating them entirely. Furthermore, with the increased use of net pricing and net/net pricing, travel agencies have found it exceedingly difficult to be profitable without passing along the cost of arranging travel to the individual or corporate client. For the same reasons, in-house corporate travel departments have been converted from profit centers to cost centers.

Travel agencies and in-house corporate travel departments often shared the commissions and overrides for each booking. Now that these commissions and overrides have been reduced or eliminated, corporate travel department budgets are running negative and typically causing the corporate travel departments to be in an accounts receivable status to the travel agencies. Therefore, travel agencies now bear an increased risk of loss due to non-payment, increased interest expense due to delay in receiving the receivable amounts, and decreased cash flow. These problems are further compounded where travel agencies have quarterly settlement with their corporate clients. For these reasons, it has recently become common practice to charge fees for arranging services provided by others to the client. This is a time consuming manual process for travel agencies who may have to reconcile and pass along these fees. It may also be confusing to individual travelers who travel infrequently. A traveler who only flies occasionally might receive a credit card statement reflecting a single charge for an airline ticket, and a second charge elsewhere on the statement reflecting the fee owed to the travel agency. The situation becomes much more complicated, however, when a single individual travels frequently and makes use of many different services by a travel agency. In this situation, the frequent traveler may find it increasingly difficult to match the fees with the related airline flight or other services.

Charging the ticket to a credit card often makes payment for the price of a ticket, although other means are also used such as checks or cash. Typically, the same payment instrument is used to pay for the fees accompanying the ticket charges. In particular, corporate credit cards and personal credit cards are frequently used to pay for tickets and related fees. One of the reasons for the difficulty in reconciling the service fees to the travel ticket charges is the lack of information typically provided on credit card billing statements and other billing statements used for corporate card accounts. Typically, the only information provided is the establishment name (e.g., the travel agency's name) and the total transaction fee (e.g., the fee associated with booking the airline flight). Furthermore, the date of the transaction may be provided; however, the date of the ticket purchase may be different from the date that the service fee is charged. In one example, the charge for the airline ticket may appear on one month's bill and the charge for the service fee could occur in the subsequent billing cycle if the cycle closes between the postings of these two charges. Adding to this difficulty of reconciling the service fee to the ticket charge is the fact that the service fee may have an establishment name related to the travel agency, but the ticket charge is likely to have an establishment name related to the airline.

The confusion in reconciling the fees to the tickets is often compounded in a corporate environment where multiple business travelers take multiple flights in any given month. In these cases, and particularly given the transformation of in-house corporate travel departments to cost centers, the in-house travel departments may want to pass along the fees to the appropriate departments within their company. In addition, these fees are often passed along within the company to the clients being served by the business. For example, an attorney's client may have agreed to pay for travel-related expenses. In these situations, it is important that the appropriate airline charges and the appropriate fees associated with those charges be accurately reconciled and forwarded to the appropriate department or corporate client. This has been a difficult task for corporate travel departments in some instances because, under the past system, a travel agent might manually collect all the fees owed by one corporate entity and forward a monthly lump sum balance owed by the corporation.

A significant amount of travel counselor intervention is often required to address the aforementioned issues. A travel counselor can manually input information to identify the fee with the appropriate airline ticket purchase. Regardless of whether this manual process occurs in the travel agency or in an in-house corporate travel department, there is an increased human error potential and a reduction in the travel consultant's productivity corresponding to the time spent performing this manual transaction.

Other billing products such as EasyFEE by Automated Travel Systems and ARC MCOs have been developed to address these issues. However, these products do not offer enhanced descriptive billing statements, and therefore the travel agencies/credit card companies receive calls from travelers requesting additional information to help them understand, validate, and reconcile their fees. Furthermore, fee systems such as ATS, EasyFEE, and ARCMCO lack the following or have the following deficiencies:

(1) they generally require manual travel counselor intervention resulting in poor time efficiency and increased error possibilities;

(2) they provide little to no descriptive bill detail resulting in increased traveler confusion trying to understand their fees and expense them;

(3) they are not able to automatically charge fees for value ads, special services, or non-air transactions and pass the cost for these services to the traveler;

(4) they do not have the flexibility to automatically charge only one flat fee for several bookings related to one trip because they have no user profile to work from; and (5) they do not automatically allow the fee to be charged to an alternate or a split form of payment because they have to bill through the airline.

Therefore, a need exists for billing with enhanced description for facilitating the reconciliation of the fees to the associated travel expenses. A need also exists for billing that avoids manually breaking out and reconciling transaction fees, and improves travel counselor efficiency. A need also exists to create a system that avoids the problems of lump billing transaction fees. There also exists a need to replace the revenue, which has been lost, as commissions have been reduced. There further exists a need to directly, systematically, and automatically bill the fees and ticket charges to the appropriate entities. There further exists a need for a system that provides a method for encouraging preferred buying practices such as paperless tickets.

SUMMARY OF THE INVENTION

The present invention provides a system for automatically billing a designated account for fees associated with the costs of tickets and other similar services. Passenger Name Record data and similar data is provided through a Computerized Reservation System and an accounting system to a Fee Allocator program which interprets the data, determines appropriate fees based on the data and a user profile, and bills the fees to an appropriate account based on the user profile. Billing data provided to the account also facilitates the process of reconciling the fees to the travel ticket costs. Enhanced descriptive billing statements can be created simplifying the process of reconciling fees to the travel ticket costs.

BRIEF DESCRIPTION OF THE DRAWINGS

The subject invention will hereinafter be described in conjunction with the appended drawing figures, wherein like numerals denote like elements, and:

FIG. 3-6 are exemplary billing statements for various industries and traveler needs;

DETAILED DESCRIPTION OF EXEMPLARY EMBODIMENTS

Figure 1:
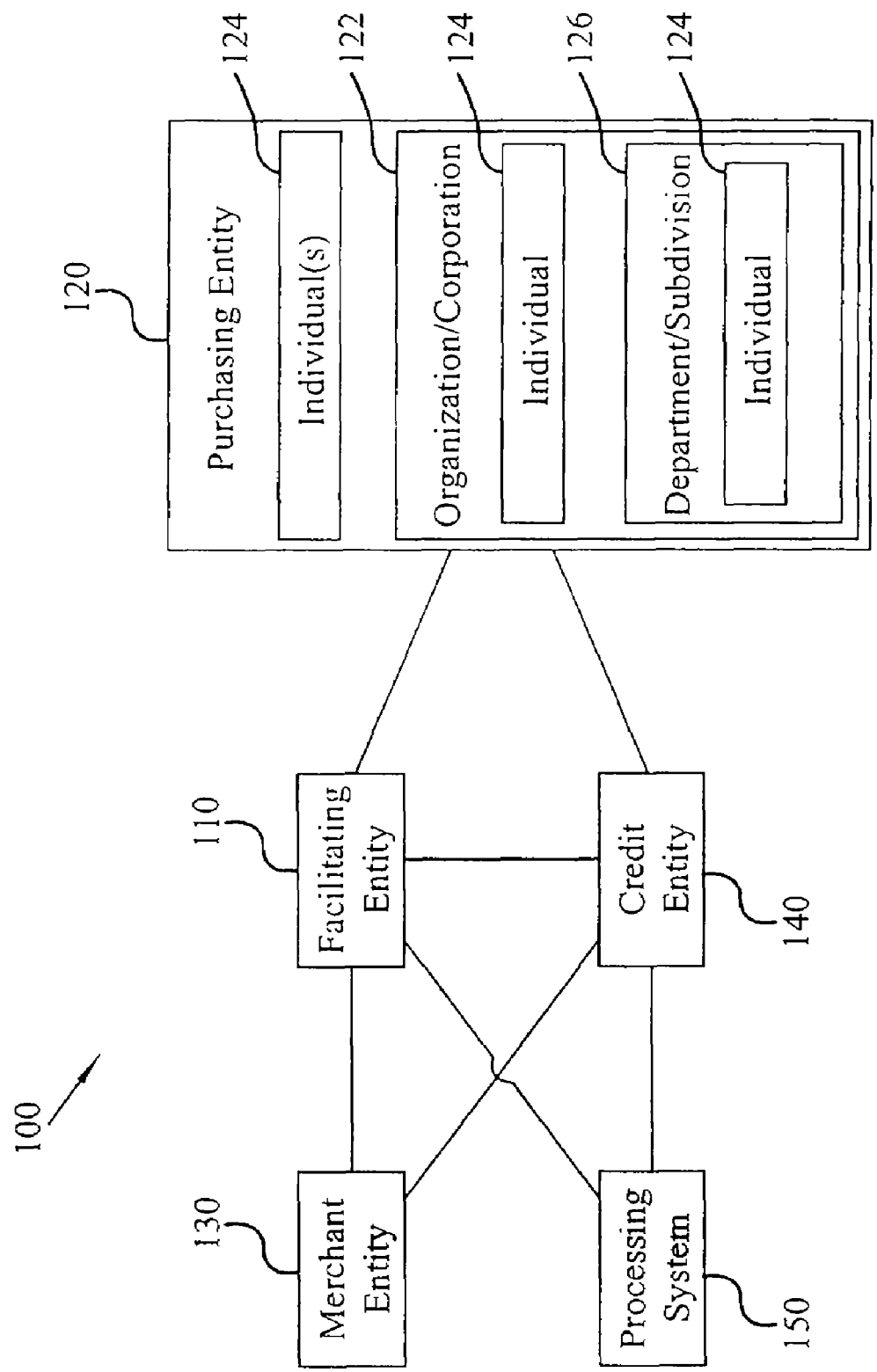
FIG. 1 is a schematic representation of an exemplary embodiment of the present invention.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. Database may be any type of database, such as relational, hierarchical, object-oriented, and/or the like. Common database products that may be used to implement databases include DB2 by IBM (White Plains, N.Y.), any of the database products available from Oracle Corporation (Redwood Shores, Calif.), Microsoft Access by Microsoft Corporation (Redmond, Wash.), MS SQL Sequel Server database on a Windows NT platform, or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, eXtensible Markup Language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention is described as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, a computer may employ a modem to occasionally connect to the Internet, whereas other computers might maintain a permanent connection to the Internet. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997). Loshin, TCP/IP Clearly Explained (1997). All of these texts are hereby incorporated by reference.

The various systems and servers may be suitably coupled to a network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Computing systems might also reside within a local area network (LAN), which interfaces to a network via a leased line (T1; D3, etc.). Such communication methods are well known in the art, and are covered in a variety of standard texts. See, e.g., Gilbert Held, Understanding Data Communications (1996), hereby incorporated by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions, which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

With reference to FIG. 1, the present invention includes a fee allocation system 100. In an exemplary embodiment, fee allocation system 100 comprises a facilitating entity 110 which is any software and/or hardware suitably configured to facilitate purchases by a purchasing entity 120 of goods or services ("items") from merchant entity 130. Purchases made by purchasing entity 120 may be charged to an account provided by credit entity 140. A processing system 150 is associated with fee allocation system 100 and is any hardware and/or software suitably configured for, among other things, automatically disbursing transaction fees to specific cost centers, facilitating enhanced descriptive billing statements, and reconciliation of transaction fees to travel related expenses as further described herein.

One skilled in the art of the financial service industry will appreciate that "account" as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

Although facilitating entity 110 is described in one exemplary embodiment of the present invention as a travel agency, facilitating entity 110 may alternatively be any embodiment where facilitating entity 110 assists purchasers in acquiring, purchasing, or using goods or services provided by merchants 130. For example, alternative embodiments of facilitating entity 110 may include Internet and e-commerce based on-line travel agencies, hotel type concierge services brokers for entertainment venues, virtual travel agents, or similar entities. Furthermore, facilitating entity 110 could be a part of merchant entity 130, such as an airline offering travel agent type services directly to its customers. Alternatively, facilitating entity 110 may be associated with purchasing entity 120, such as when a corporation or organization has one or more in-house travel departments that facilitate travel arrangements directly with merchants 130 on behalf of employees of that organization or corporation.

Purchasing entity 120, in an exemplary embodiment of the present invention, may represent a person, business, organization, corporation or other entity or any software and/or hardware 122. Organization 122 may include individuals 124 which may be within further subdivisions or departments 126 of business 122. Alternatively, purchasing entity 120 may represent a single individual or a group of individuals 124. In an exemplary embodiment, individual 124 desires travel related services and may either contact facilitating entity 110 directly, or may contact facilitating entity 110 through organization 122 or subdivision 126 to arrange the desired travel related services.

Merchant entity 130, in an exemplary embodiment, represents an airline selling travel related services. However, merchant 130 may alternatively be any type of travel related merchant entity providing travel services such as: rail services, bus services, car rental services, hotel reservations, traveler checks and/or the like. Furthermore, merchant entity 130 may provide other value added services such as emergency travel services, international rate desk, and executive travel and concierge services such as, for example, similar services provided by American Express®. Merchant entity 130 charges purchasing entity 120 the cost of the goods or services acquired through this transaction. This cost may be charged directly to purchasing entity 120. In another embodiment, this cost may be charged to purchasing entity 120 via a credit account with credit entity 140. Merchant entity 130 may also provide exchanges, rebates, frequent flier miles, refunds, and credits to purchasing entity 120, some of which may be offered through credit entity 140 or facilitating entity 110. Merchant entity 130 may also provide non-travel related services or goods of any type or nature; for example, tickets to sporting and other entertainment venues. Furthermore, merchant entity 130 could be a typical bricks and mortar type merchant or, alternatively, may be an on-line e-commerce type merchant, or may advertise and provide goods and services through any other commonly known mediums.

For more information on transaction systems, electronic commerce systems, digital wallet systems and loyalty systems, see, for example, the Shop APEX™ system as disclosed in Ser. No. 60/230,190 filed Sep. 5, 2000; the MR as Currency™ and Loyalty Rewards Systems as disclosed in Ser. No. 60/197,296 filed on Apr. 14, 2000, Ser. No. 60/200,492 filed Apr. 28, 2000, and Ser. No. 60/201,114 filed May 2, 2000; a digital wallet system as disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers as disclosed in Ser. No. 09/800,461 filed on Mar. 7, 2001; and also in related provisional applications Ser. No. 60/187,620 filed Mar. 7, 2000, Ser. No. 60/200,625 filed Apr. 28, 2000, and Ser. No. 60/213,323 filed May 22, 2000, the general technology of all references is hereby incorporated by reference. Other examples of online membership reward systems are disclosed in U.S. Pat. No. 5,774,870, issued on Jun. 30, 1998, and U.S. Pat. No. 6,009,412, issued on Dec. 29, 1999, along with other incentive award programs described in U.S. Pat. Nos. 5,774,870 and 6,009,412, issued to Thomas W. Store and assigned to Netcentives, the general functionality of all references is hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; the general technology of all references is hereby incorporated by reference. Information on point-of-sale systems and the exploitation of point-of-sale data is disclosed in U.S. Pat. No. 5,832,457, issued on Nov. 3, 1998 to O'Brien et al., the general technology of which is hereby incorporated by reference.

Although credit entity 140 is described in an exemplary embodiment of the present invention as American Express Credit Services®, credit entity 140 may represent any bank, credit card provider, or other lending institution. Credit entity may be any organization, individual, entity, software and/or hardware suitably configured for providing a billing mechanism whereby purchasing entity 120 may compensate merchant entity 130 and/or facilitating entity 110 for facilitating delivery of goods or services from merchant entity 130. It is further understood that credit entity 140 may be an independent entity unrelated to the facilitating entity, the purchasing entity, or the merchant entity. Credit entity 140 may also be, in further exemplary embodiments, associated with one or more of these entities. For example, American Express is in the business of providing both travel services as a facilitating entity 110 and credit services as a credit providing entity 140. In other embodiments, a merchant entity 130 may offer credit services, and in further embodiments purchasing entities may have credit providing divisions within their own organizations 122.

Processing system 150 typically comprises any software and/or hardware suitably configured for enabling the process steps of the present invention as described herein. Processing system 150 may exist in one physical location or, alternatively, may be disbursed in several locations physically. Furthermore, processing system 150 may exist independently of facilitating entity 110 and credit entity 140 or may be distributed as part of or all of facilitating entity 110, credit entity 140, and processing system 150.

In one embodiment of the present invention, facilitating entity 110 is configured to operate within the fee allocator system 100 by installing software on a computer located at facilitating entity 110 or by installing or updating software and/or hardware at remote locations that are associated with facilitating entity 110. This software may include fee allocator scripts or other files used to update existing software. One or more of processing system 150, credit entity 140, and facilitating entity 110 may be pre-configured with information for the fee allocator program.

In an exemplary embodiment, an itinerary in a reservation system may be associated with a set of rules that should be followed. For example, a traveler may be associated with a rule that states that the flight can be rescheduled as long as the arrival time is within, e.g., 60 minutes of the booked flight. Additionally, a rule may state that the traveler is willing to travel from or to a variety of airports (in a city with multiple airports, such as New York). Thereafter, each flight itinerary of that traveler may be associated with the traveler's rules. In the alternative, each traveler may be associated with a rule set by their employer. Another alternative allows each itinerary to have a set of rules that is set at the time that arrangements are established. Several of the above examples may be combined with each other. For example, a traveler may have a personal set of rules as well as rules set by his employer. In another embodiment, a traveler may have a general set of rules, but may be able to augment or change those rules at the time of placing each specific flight.

One method of associating rules with a traveler is to use an extension of the typical "member profile." A traveler typically completes a member profile in which he indicates his preference for, e.g., a window seat or an aisle seat. Such a profile may be extended to include information as to the traveler's rules. In addition, an organization may have an organization profile, which indicates, e.g., a policy, which does not allow First Class travel. The organization profile may be extended to contain rules that are associated with the organization as a whole.

A user profile may be established for each purchasing entity 120, which may contain information such as: billing preferences, fees or fee formulas for reimbursing facilitating entity 110, information regarding accounts to which fees are to be charged, and information regarding how frequently fees are billed to purchasing entity 120. For example, the user profile may indicate which credit card and account number is to be used for billing the fees. Other preferences can also be included in the user profile such as 'agreed to fee rates' for specified services and prohibitions on using paper tickets.

Information in the user profiles may designate where certain fees should be charged. For example, fees charged for arranging an airplane ticket may be charged to the same account as was used to pay for the airplane ticket. In another embodiment, those fees may be routed to a different account than the one used to pay for the airplane ticket. As another example, a corporation may wish to have all fees billed to a particular account, to a particular department, or to designated client/project accounts. Furthermore, processing system 150 can redirect fees to credit entities such as American Express, VISA, MasterCard, or other such financial accounts or transaction cards. This flexibility allows the purchasing entity to predetermine how they would like to be billed. The user profile may also specify whether individual fees are charged for each service or whether one fee is to be charged for all services associated with a particular trip. Use of the fee allocator system also allows purchasing entity 120 to avoid the manual time consuming efforts involved in reconciling these fees, and opportunity for human error is reduced.

Purchasing entity 120 may agree to a periodic fee billing method, and to the amount of the fees or to a formula for calculating fees owed. In one embodiment of the present invention, the fees may be downloaded from a facilitating entity's accounting system to a fee allocator program on a daily basis where the fees are processed and then transmitted to credit entity 140. In an alternative embodiment, one or more of the steps of downloading, processing and transmitting may occur on a more frequent or less frequent basis as desired.

Fees may be calculated or established in a variety of ways. For example, facilitating entity 110 may charge a set fee for each item transaction (for services provided or goods delivered). Alternatively, fees charged by facilitating entity 110 may vary. Fees may vary by depending on the types of goods or services, may vary based upon or proportional to the price of the goods or services offered by merchant entity 130, or facilitating entity 110 may establish other formulas for calculating fees. Fees may be established to influence preferred purchasing entity behavior. Furthermore, facilitating entity 110 may wish to set fees to achieve certain goals and receive incentives from merchant entity 130. Fees may also be established to compensate for operating costs and profits needed by facilitating entity 110. For more information on fee charging systems, see, for example, U.S. Pat. No. 4,970,655, Automatic fee collecting and receipt dispensing system; U.S. Pat. No. 5,634,012, System for controlling the distribution and use of digital works having a fee reporting mechanism; and U.S. Pat. No. 5,987,429, Computer-based fee processing for electronic commerce, the general functionality and technology of which is hereby incorporated by reference.

In one embodiment, an additional fee may be charged to purchasing entity 120 for use of the fee allocator system. This fee may be structured to encourage preferred behavior. Alternatively, because fee allocator system 100 provides many benefits to a facilitating entity 110, facilitating entity 110 may provide the fee allocator system benefits to purchasing entity 120 free of charge. Benefits include the possibility of directing more traffic to a particular credit entity 140. For example, credit entity 140 may wish to encourage facilitating entity 110 to use fee allocating system 100 to in order to direct more business to credit entity 140. Furthermore, facilitating entity 110 can influence spending habits of purchasing entity 120 by varying the fees charged to encourage desired behavior, thus the facilitator may, for example, charge less for preferred behavior and more for undesirable behavior. Undesirable behavior may include use of paper tickets, information only calls, ticket copy requests, etc. Desirable behavior (e.g., charging lower fees for interactive bookings, e-tickets) results in increased travel policy compliance, which results in more efficient spending for company travel. Facilitating entity 110 also benefits from the ability to automatically charge fees to a credit card type account as opposed to billing a client and waiting for the client to send the money. The automatic ability to direct the appropriate fees to the appropriate charge accounts can reduce the chance of human error by facilitating entity 110 in preparation of billing statements, and also improves travel consultant efficiency because the travel consultant does not have to spend the time manually entering or manipulating these fees. The ability to charge the fees to an account can improve cash flow and shifts the risks of loss to the accounts.

Figure 9:
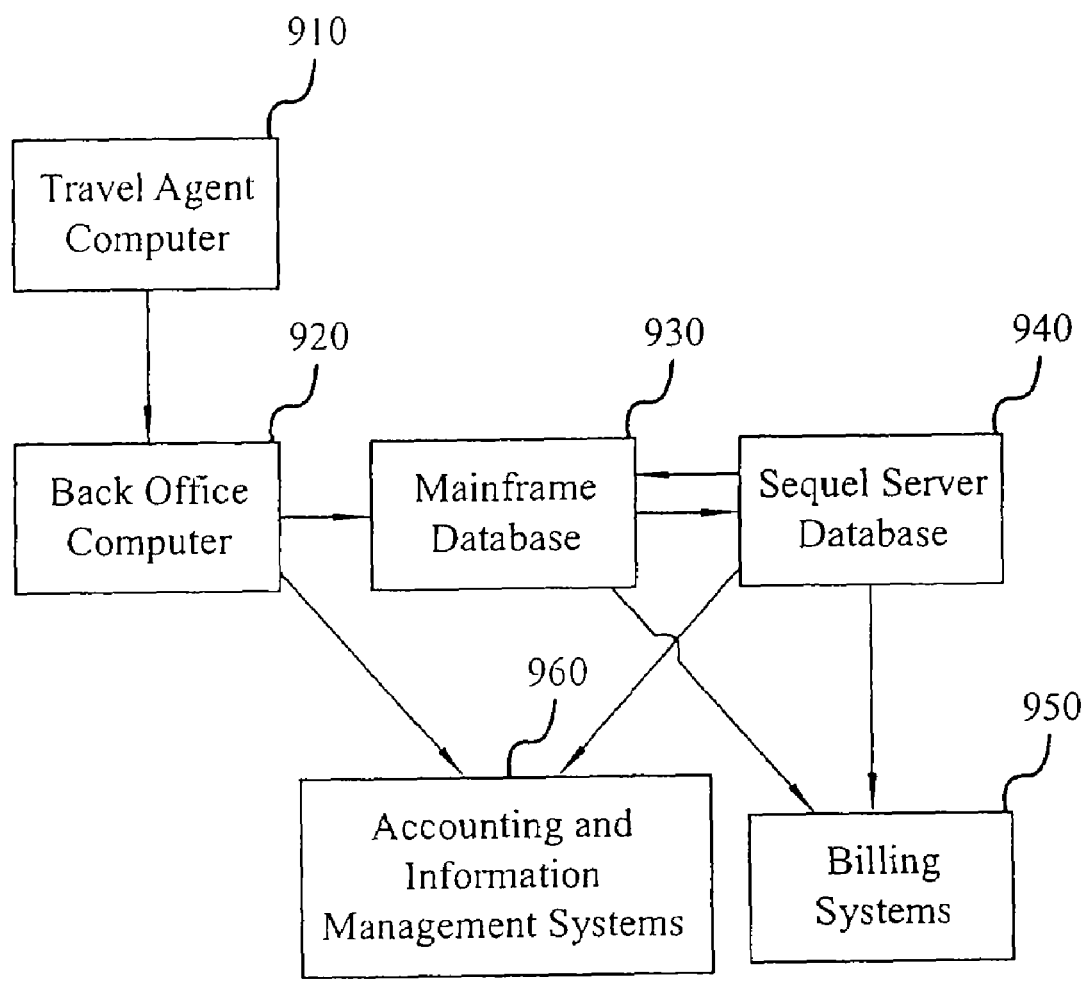
FIG. 9 is a block diagram showing an exemplary embodiment of the present invention.

FIG. 9 shows physical systems which, in various embodiments of the present invention, make up parts of facilitating entity 110, credit entity 140, and processing system 150, as shown in FIG. 1. Facilitating entity 110 may include a travel agent computer 910. Credit entity 140 may further be include billing systems 950. Processing system 150 may further be composed of back office computer 920, mainframe database 930, sequel server database 940, and accounting and information management systems 960. A travel agent will typically have a computer 910 for making reservations and providing reservation and user profile information for further processing. For example, travel agent computer 910 may pass this information to a "back office" computer 920. Back office computer provides information to a mainframe database 930 as well as other accounting and information management systems. Mainframe database 930 provides relevant reservation information (filtered data) to sequel server database 940, which then combines that information with user profile information to generate appropriate billing information, which can then be passed to billing systems 950 and accounting systems 960.

Travel agent computer 910 may use a computer system that contains a database of travel arrangements. The databases of existing systems, also known as Computer Reservation Systems ("CRS") or Global Distribution Systems ("GDS"), in which travel arrangements are stored may be used in this context. For example, companies such as Amadeus Global Travel Distribution, LLC, of Miami, Fla., Sabre, Galileo, and Worldspan each run a GDS. Other databases, such as those used by travel agencies with a World Wide Web presence such as Microsoft's Expedia site or Sabre's Travelocity site, may also be accessed by an embodiment of the present invention. All of the foregoing known systems are hereby incorporated by reference. For more information on centralized registration systems, see, for example, U.S. Pat. No. 6,023,679, Pre- and post-ticketed travel reservation information management system; U.S. Pat. No. 5,948,040, Travel reservation information and planning system; U.S. Pat. No. 5,842,176; Method and apparatus for interacting with a computer reservation system; U.S. Pat. No. 5,237,499, Computer travel planning system; U.S. Pat. No. 6,009,408, Automated processing of travel related expenses; U.S. Pat. No. 6,122,642, System for propagating, retrieving and using transaction processing facility airline computerized reservation system data on a relational database processing platform; and U.S. Pat. No. 5,897,620, Method and apparatus for the sale of airline-specified flight tickets; the general functionality of all references is hereby incorporated by reference.

The database typically consists of a number of different fields that are formatted to contain specific information. The rows or records contain a memorialization of a reservation, with information in each of the fields. For example, a field in the database may be titled DATE_DEPARTURE and may contain information regarding the departure date of each row in the database. A row in the database would indicate each of the particulars of a reservation, for example, the name of the traveler, a contact method, the departure time and place, and the arrival time and place. Each row corresponds to a Passenger Name Record ("PNR") in the database. The PNR contains reservation information including the type of ticket (electronic ticket, paper ticket, exchange ticket).

Figure 2:
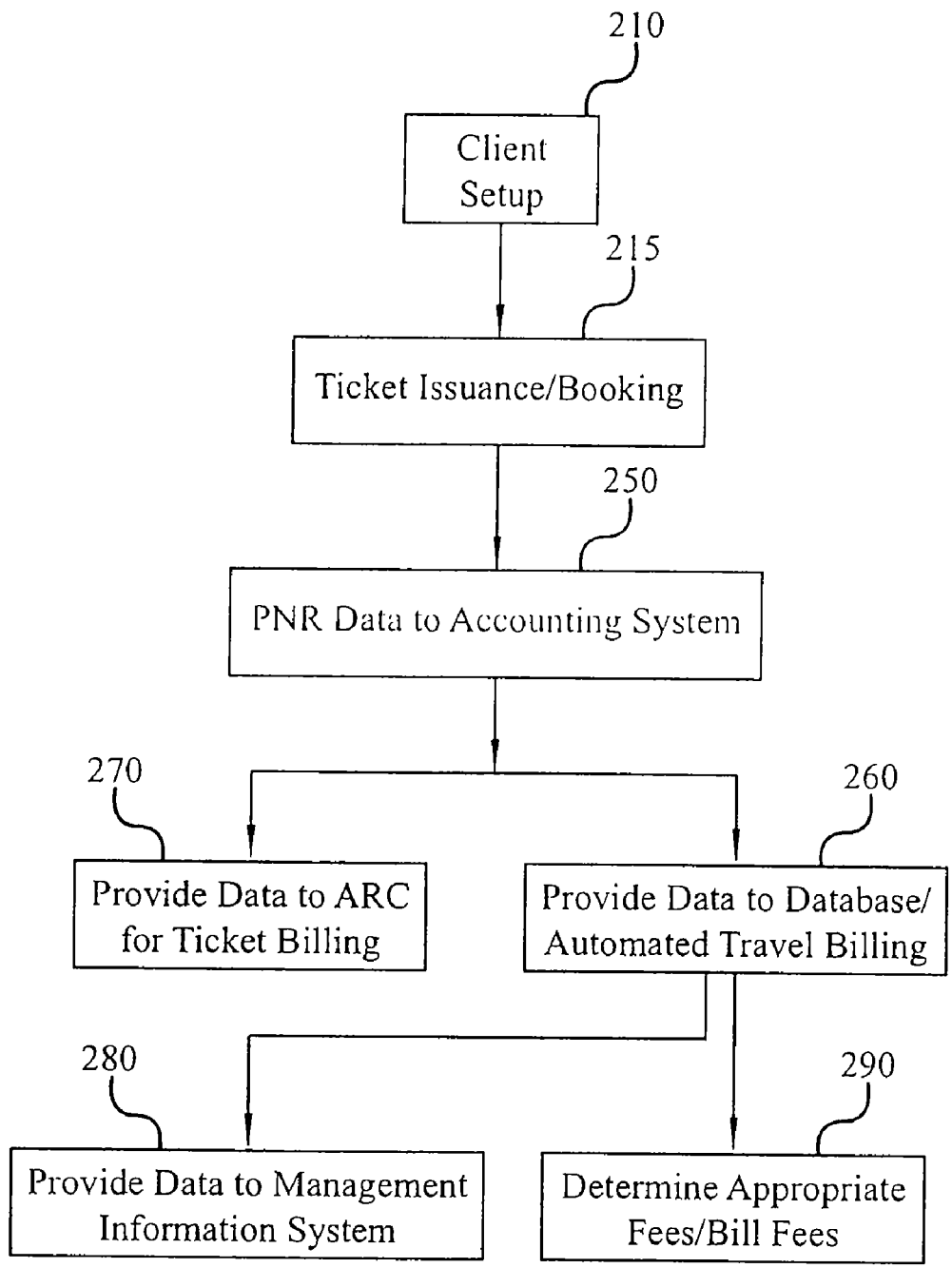
FIG. 2 is a block diagram showing an exemplary embodiment of the present invention.

With reference now to FIG. 2, a general overview of the fee allocator system is discussed. Initially, the travel office must go through a client set up process 210 where computer programs and scripts and user profiles are prepared for future use. In one embodiment, during ticket issuance/booking processes 215, flights are booked by the travel agency for a traveler 124 on an airline 130, invoices are printed, and the CRS system sends PNR data to a back office accounting system.

In an exemplary embodiment, the CRS system provides booking information, such as that included in the PNR, in the form of an accounting interface record to a travel agency accounting system (step 250). These travel agency accounting systems are also known as back-office accounting systems and one example of such a system is MAX used by American Express®. The accounting system may be associated with facilitating entity 110 and may be a part of processing system 150. The accounting system may, among other things, forward all or some of this data to an Airline Reporting Corporation (ARC) system (step 270). The ARC processes this information and bills the purchaser's credit account for the airline ticket (step 270).

The travel agency accounting system provides the PNR data to one or more databases and processes the data with an automated travel billing system (step 260). The automated travel billing system then may provide information to management information systems (step 280) and determine appropriate fees (step 290).

Figure 7A:
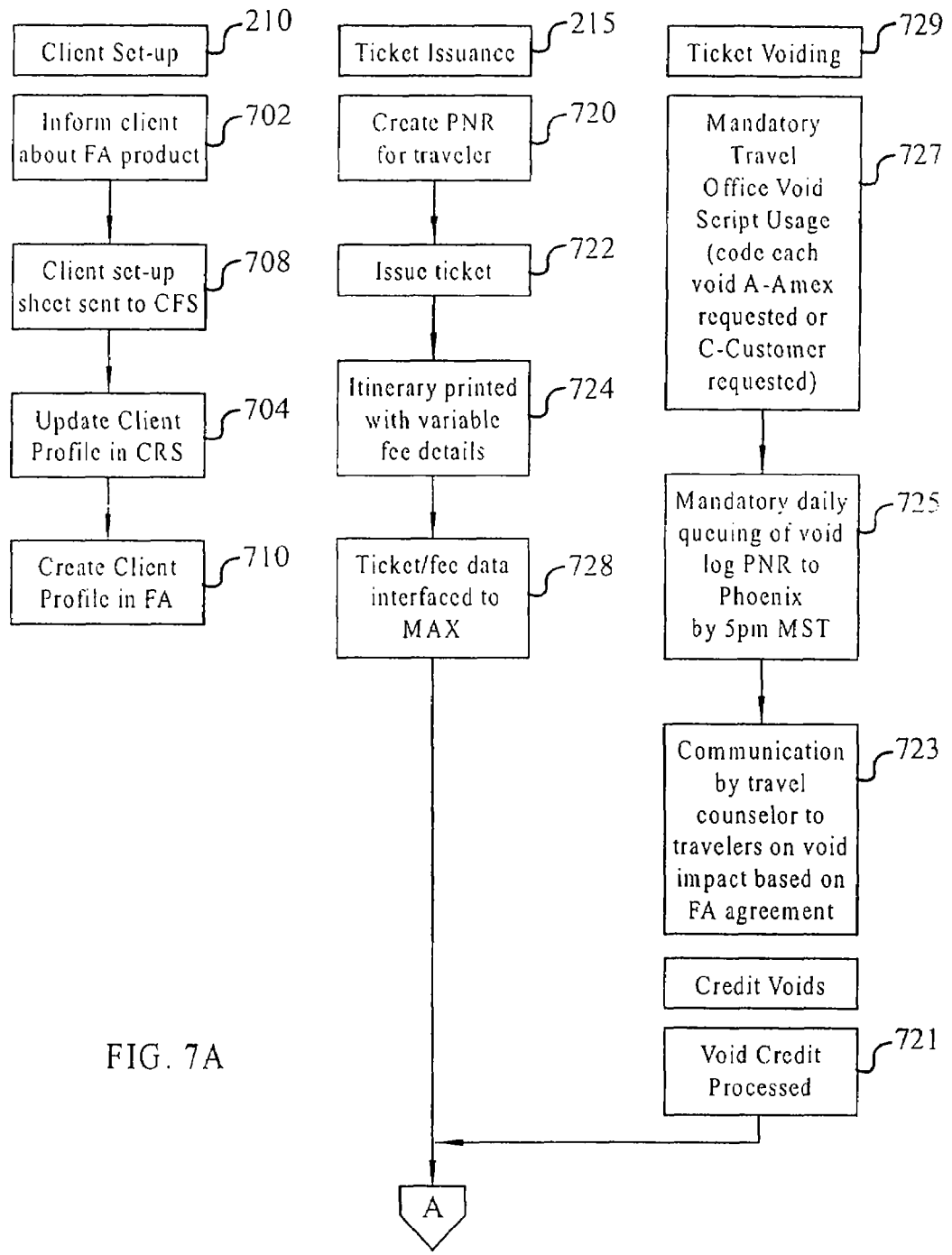
FIG. 7-8 are detailed block diagrams showing exemplary embodiments of the present invention.
Figure 7B:
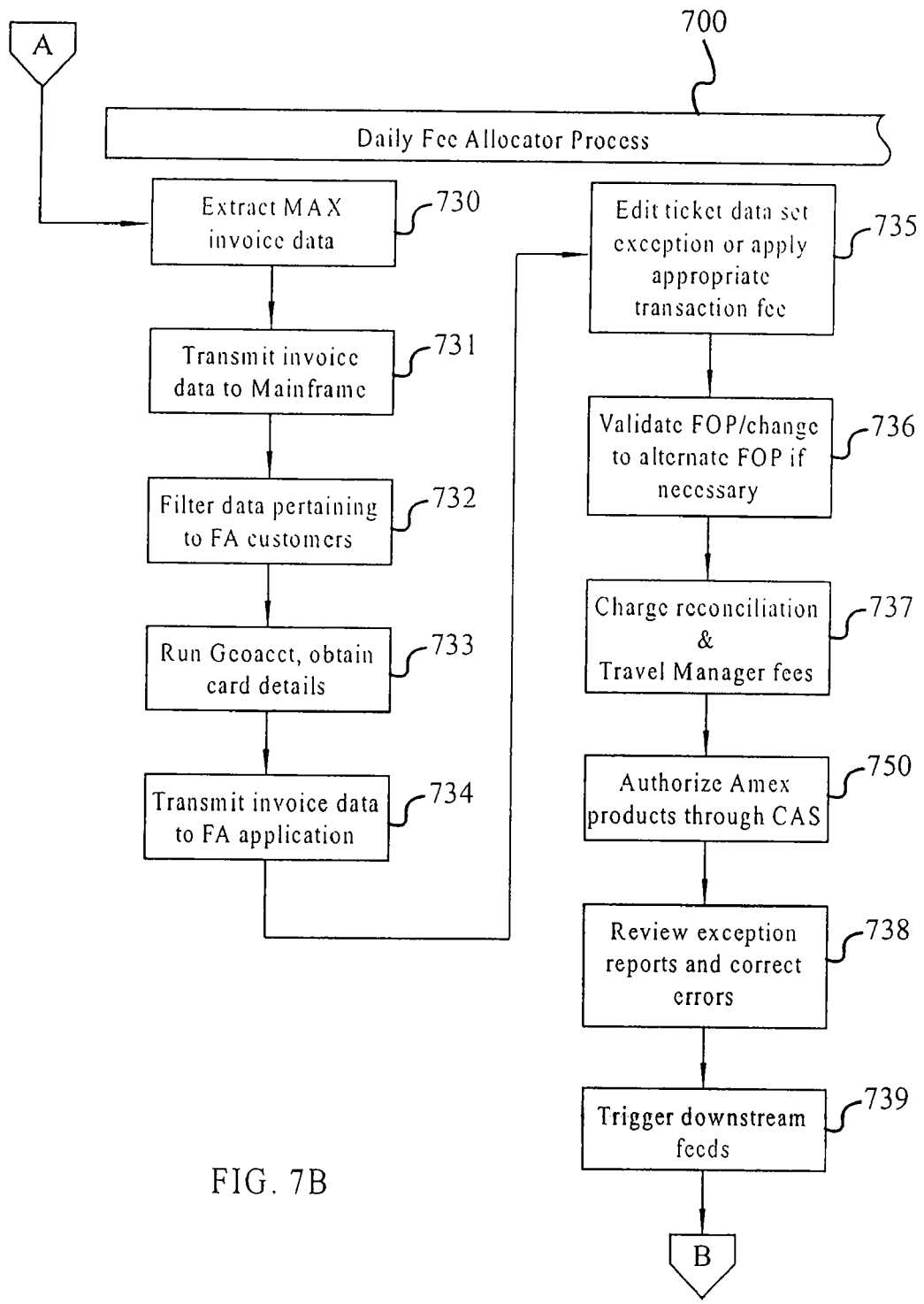
Figure 7C:
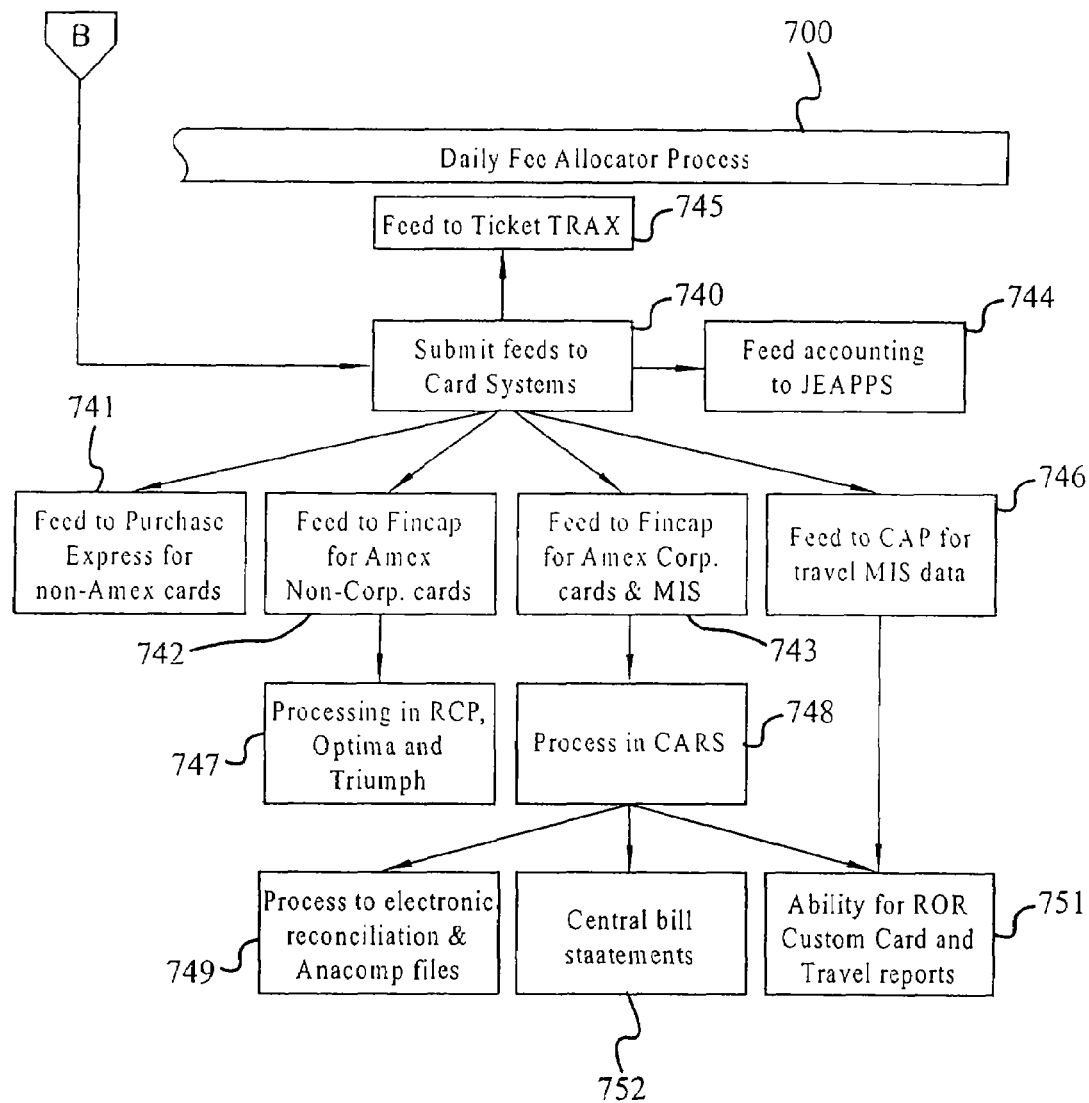

The fee allocator process can be understood in further detail with reference to FIGS. 7A-7C. An exemplary client setup process (step 210) may start when the clients (typically a travel agency and/or business traveler) are informed of the fee allocator product and agree to fee billing and other terms (step 702, FIG. 7A). Client profiles are updated or created through the travel agency's central reservation system and in accordance with these agreements (step 704). The client profiles may be updated and provided to systems as described herein through use of 'scripts,' which provide automated functions. As discussed above, a variety of fees can be established for different services, and multiple profiles can be created for charging different fees to different divisions within a corporation. The client set up is reported out to a Client Financial Services system (step 708), which creates a client profile in the fee allocator ("FA") system (step 710). Although this may be a one-time setup process, the member profile information may be modified from time to time as desired by the client.

In FIG. 7A, a typical ticket issuance sequence (step 215) is described in accordance with one embodiment of the present invention. Facilitating entity 110 may utilize a computer airline booking system, such as a CRS to facilitate finding an airplane flight suitable to individual 124 and arranging a travel reservation on that flight. For example, during the ticket booking process, a travel agent creates a PNR (step 720) upon customer request to book a flight, issues a ticket (step 722), and prints a travel itinerary with the transaction fee printed on the traveler's invoice/itinerary (step 724). The invoice/itinerary may show a message reminding the purchaser that the service fee has been charged according to the customer's profile. In other embodiments, the step of printing paper tickets and invoices may be avoided by using, for example, E-tickets. The transaction fee may be calculated based on the client profile through the use of scripts. The PNR data may then be provided to travel agency accounting system (step 728). The transaction fee may be captured in the DS2 field (e.g., fees for Ticket TRAX only) of the PNR and interfaced to the accounting program, thus avoiding the use of some scripts.

In some embodiments, fees for non-CRS services are included in the PNR record associated with purchase of a ticket or similar CRS services. In other embodiments, fees for non-CRS services may be charged through the CRS system by appending the fees to a zero dollar invoice in the CRS. The zero dollar invoice can be sent out via the CRS as a carrier of information needed to perform automated billing of fees. As an example, a fee may be charged for special services not offered through the CRS system such as emergency travel services. In this case, a script may be used to create a zero dollar invoice, which may be sent out through the CRS system. A script is a series of commands, which helps automate a process. The zero dollar invoice contains data that can be interpreted by the automated billing processes for determination of the appropriate fee(s) to be charged. These zero dollar invoices may also be used to process fees for manual/phone booked airline flights where the flight is booked without going through the CRS, but the fee is charged through the CRS. In a further embodiment, the scripts may automatically create these zero dollar invoices when non-CRS services are purchased. For example, when an agent processes a request for emergency travel services, a script can cause a three digit term code to be provided in the remarks field of a zero dollar invoice in the CRS system where the three digit term code can later be interpreted to determine what kind of transaction took place and therefore how much to charge.

With further reference to FIG. 7A, a ticket voiding process 729 may include steps such as using scripts to code each voided ticket as either Travel agent requested or Customer requested (step 727). The void log PNR is electronically transferred to a back office accounting system on a periodic basis (step 725), and travel counselors inform travelers of the impact of voiding tickets under the Fee Allocator agreements (step 723). Under appropriate circumstances, such as when the void is requested by the travel agent, the fees charged by fee allocator would be refunded (step 721) and this data passed to the back office accounting system.

With reference to FIGS. 7B and 7C, the daily fee allocation process 700 is described in further detail. In an exemplary embodiment, the travel agency accounting system stores all or some of the PNR data from the CRS in a database, for example, on a mainframe computer (steps 728, 730, and 731). The data in this database is filtered (step 732) such that only relevant data is provided for automated billing to create an invoice file. The mainframe also processes the PNR data to determine the type of credit card or account used and to supplement the database and filtered invoice file with additional relevant information (step 733). This file is then downloaded to a Sequel Server running the fee allocator system (step 734). It is noted here that processing system 150 may be configured such that the herein described processes are automatically executed on a periodic basis.

The invoice file is matched against periodically (for example, weekly) updated billing system profile data, received during step 710, to create a consolidated file that associates each invoice transaction with the related information from the client's billing profile. The consolidated file is then used to automatically bill the appropriate fee to the purchaser's credit account (through the steps described below). During this process, the PNR information in the consolidated file, such as the traveler's name, type of ticket, or travel service is recognized and used to determine an appropriate fee.

In one embodiment, the fee charged always corresponds to the fee indicated in the user's profile information that correlates to the type of transaction indicated in the consolidated file. In this embodiment, all fees are programmed during the account set-up process. The fees are then automatically charged when the invoice is driven through to MAX. MAX automatically reads the invoice for CRS services or reads the term codes entered by the travel counselors using scripts for non-CRS services. In another optional embodiment, the fee indicated in the DS2 field may be compared to the fee indicated by that user's profile information to validate the indicated fee, chose the lower of the two, or over-ride the indicated fee with the profile fee (step 735).

Fee allocator may also validate the form of payment (FOP) (step 736). In this step, the user profile is checked to see if the user wants to bill the fees to the same account used for the ticket or to an alternately designated account. If agreed upon (noted in user profile), a reconciliation fee and/or travel manager fees may be charged (step 737). Automatically determining the appropriate fees for billing may take place, for example, on a MS SQL Sequel Server database on a Windows NT platform.

Next, credit entity 140 may authorize charges to their own accounts (step 750). For example, American Express products, including individual Corporate and Personal Cards, Corporate Purchasing Cards and central bills, may be authorized through American Express' Card Authorization System (CAS), which will approve or decline the form of payment. Next, exception and rejection reports can be generated with reason codes and stored for example in a Lotus Notes database (step 738). These exception reports may be manually processed and reviewed for further action. Feeds are then sent to card systems (step 739 on FIG. 7B and 740 on FIG. 7C) such as non-affiliate cards (step 741), affiliate non-corporate cards (step 742), and affiliate corporate cards (step 743). If the purchaser's user profile indicates that the fees are to be charged to a non-affiliated credit entity, then the charges with the relevant ticket number or record locator number are delivered through a third-party processor, such as Purchase Express, or Payment Link.

Feeds are also sent to accounting programs (step 744) and other information systems for reporting (step 745). The system may periodically provide travel management information to accounting programs, such as American Express's Global Information System (GIS), which produces reports for the travel agency. These reports may include summaries of the number of types of services rendered, and the fees charged for those services. American Express' Client Financial Services may also process a monthly settlement, which: (1) totals travel agency service fees that are due to American Express; (2) subtracts commissions and overrides; (3) subtracts total transaction fees collected through fee allocator; and (4) automatically charges any negative balance to business accounts if applicable, or returns a positive balance to the client via check or charge card credit.

The credit entity's own non-corporate card feed may be transferred to payment processing systems such as Regular Card Products, Optima, and Triumph (step 747). These systems perform the processing necessary to generate personal billing statements. Although examples of several billing statements are provided herein, it is noted that for non-affiliate cards and for non-corporate credit entity cards, the descriptive information is generally more limited. For example, some non-affiliate billing programs limit the description line to 17 characters. Other non-corporate billing processing limits the description to two lines of information. Enhanced descriptive billing information can be provided for some billing products. For example, fees to be charged to corporate card accounts are directed through the Corporate Accounts Receivable System (CARS), which manages accounting tasks and provides information to a number of corporate billing accounts (step 748). For example, CARS provides fee billing information to central bill statement programs (step 752) shown in further detail on FIG. 8B. CARS also provides information to other custom billing and reconciliation systems (steps 749 and 751).

Figure 8A:
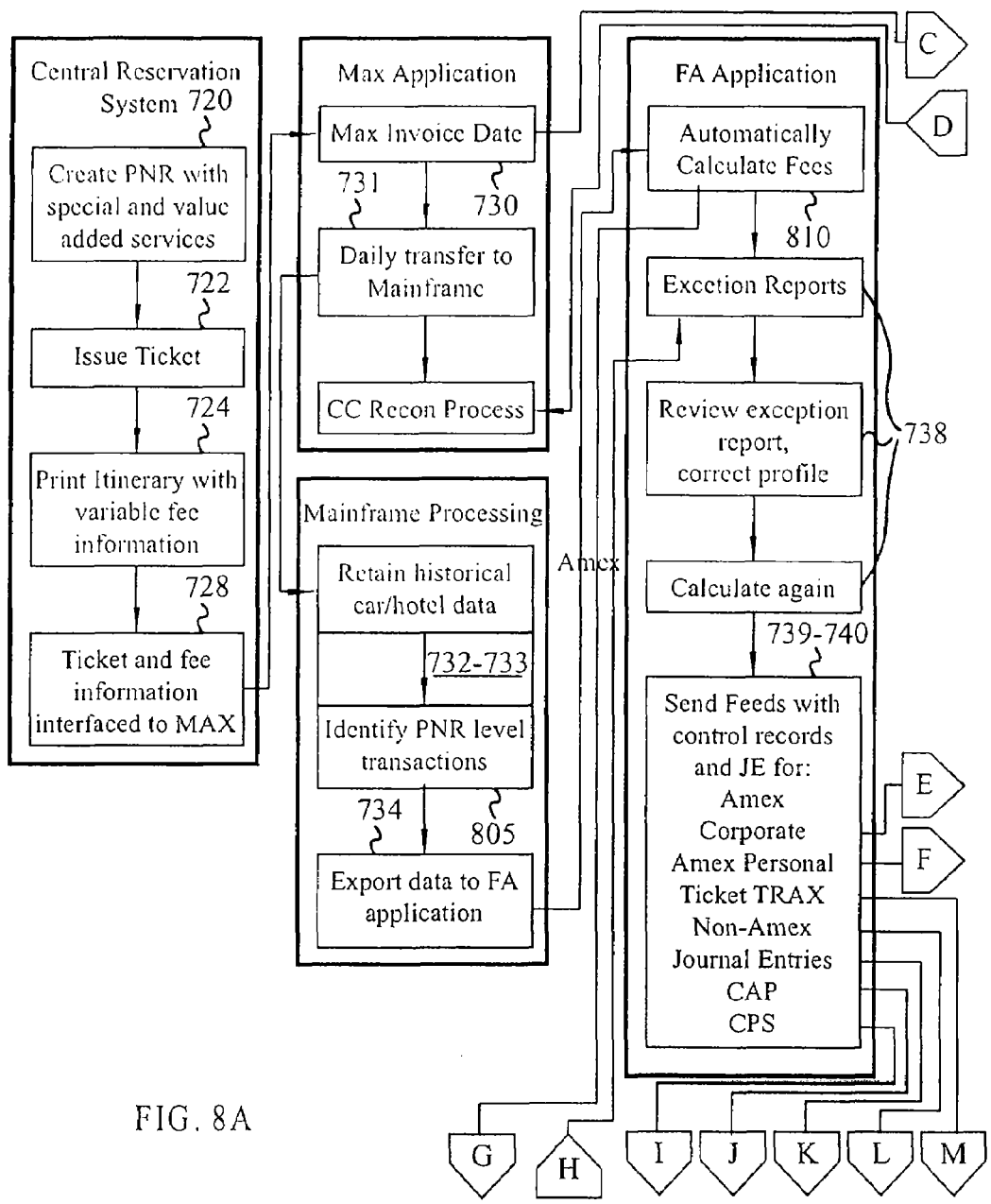

FIG. 8A through 8E show application architecture block diagrams showing more detail on an exemplary system including the fee allocator system. Selected steps conform to those steps illustrated in FIGS. 7A-C. With reference now to FIG. 8A, in one embodiment, the process of automatically calculating fees (step 810) occurs on a Sequel Server, which compares invoice information from PNR data to user profile information to match up the correct fees to the transactions. This process may also include the optional ticket data override (step 735, FIG. 7B). These steps are more fully discussed above.

The mainframe processing may identify PNR level transactions and identify if this PNR data is the first occurrence for that trip, or a subsequent occurrence on the same PNR record. Step 805, FIG. 8A. In this way, the fee allocator can later process fees for each transaction, or on a per trip basis, depending on the user profile selections.

While processing for Non-affiliate cards may proceed from step 810 to step 738, processing for affiliate cards may temporarily divert to step 750 where the authorization is first checked to make sure that the fees can be charged to the chosen account. Downstream feeds are provided to a number of applications and databases shown at reference number 815 on FIG. 8C, such as the following American Express applications: Ticket TRAX, Purchase Express, JEAPPS, CAP, Client Payment System (CPS) Legacy, and a Lotus Notes Database. These downstream feeds provide fee allocator information in the appropriate format to these accounting applications and databases.

Figure 8B:
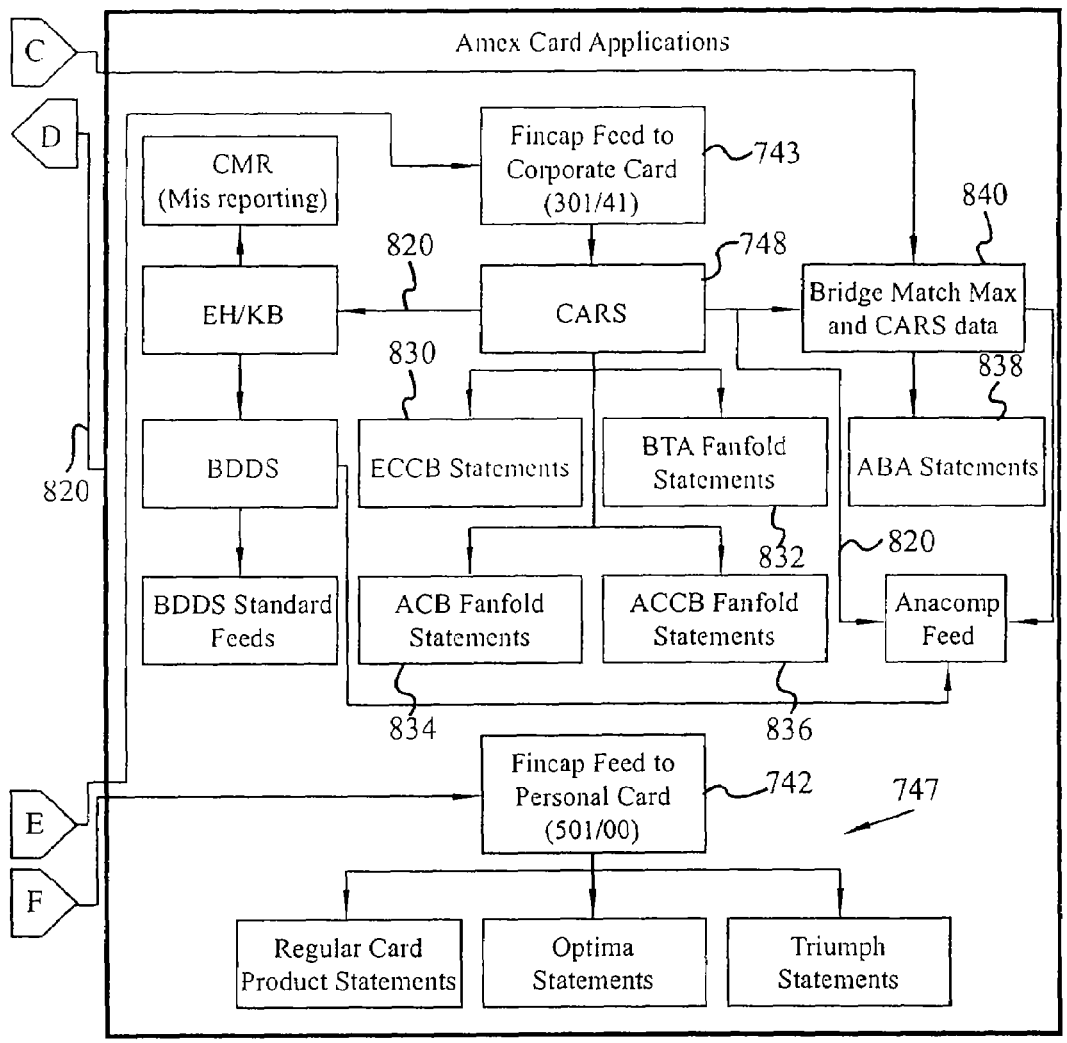
Figure 8C:
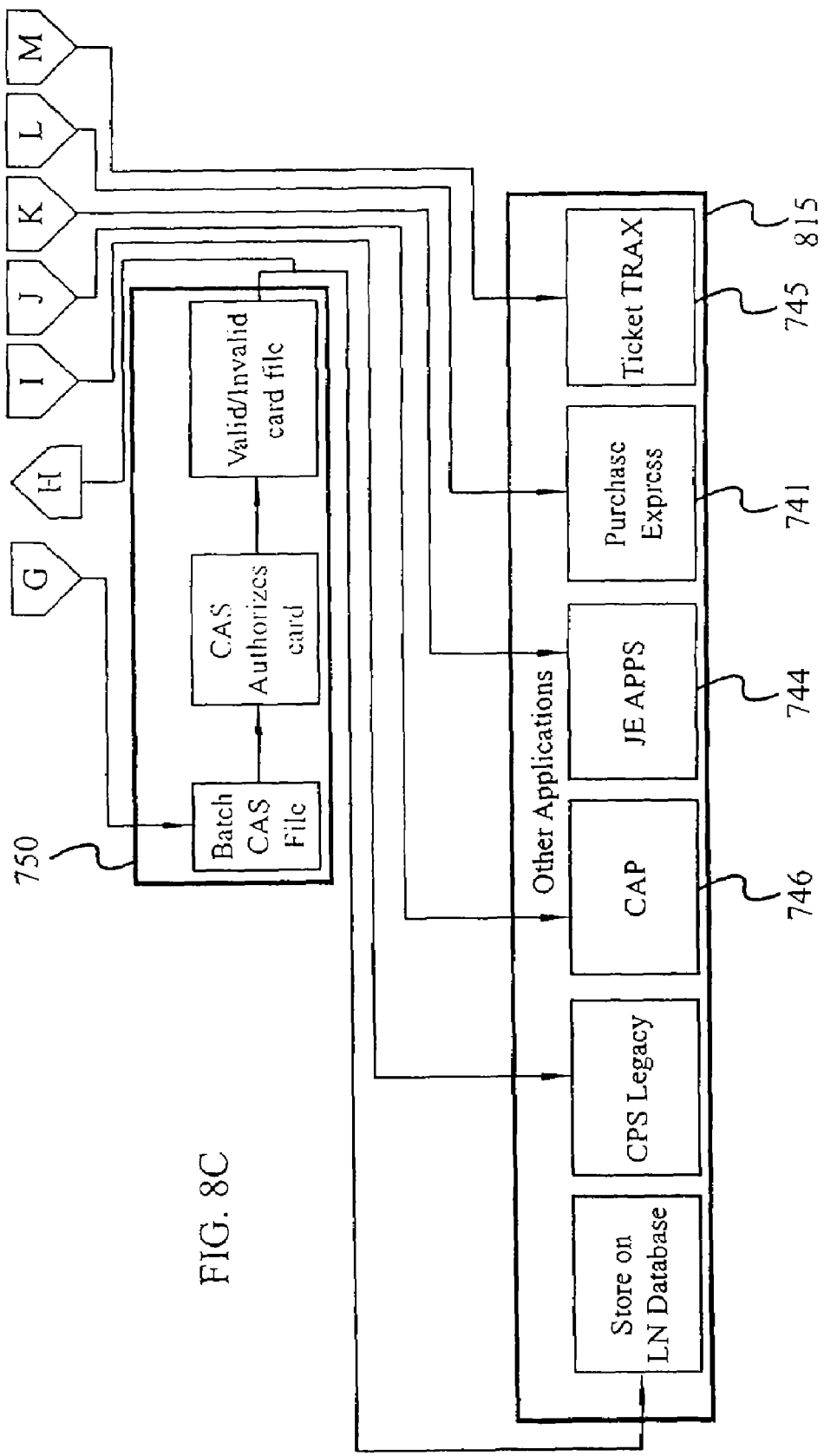

With reference to FIG. 8B, for personal card billing affiliated with credit entity 140, data may be provided to an accounting system, such as American Express' Fincap 501/00 (step 742), which processes the fees and assists in preparing billing statements (step 747). For corporate card billing affiliated with credit entity 140, data may be provided to an accounting system, such as American Express' Fincap 301/41 (step 743), which provides a "back-door" entry for passing in Fee Allocator data into the Corporate Accounts Receivable System (CARS) (step 748). Through this "back door", the enhanced descriptive billing information can be passed to provide, in one embodiment, 3 lines of 42 characters each of billing data. CARS processes data processes the fees and assists in preparing billing statements (step 747).

CARS provides down stream feeds for electronic statement clients, reconciliation systems, automated expense-reporting tools, other custom billing systems, and management information systems. These feeds and the related system are identified as 820. CARS also provides fee allocator data processing such that sub-systems can generate various billing statements that correctly incorporate the fee allocator fees into the unique presentation of the individual billing statements. The variety in these billing statements is exemplified by American Express statements such as Enhanced Country Club Billing (ECCB) 830, Business Travel Accounts (BTA) 832, Airline Central Billing (ACB) 834, Airline Central Credit Billing Fanfold (ACCB) 836, and Airline Billing Account (ABA) 838. In each of these billing statement types, the fee allocator fee is recognized and classified in the appropriate place as discussed in more detail below.

Figure 8D:
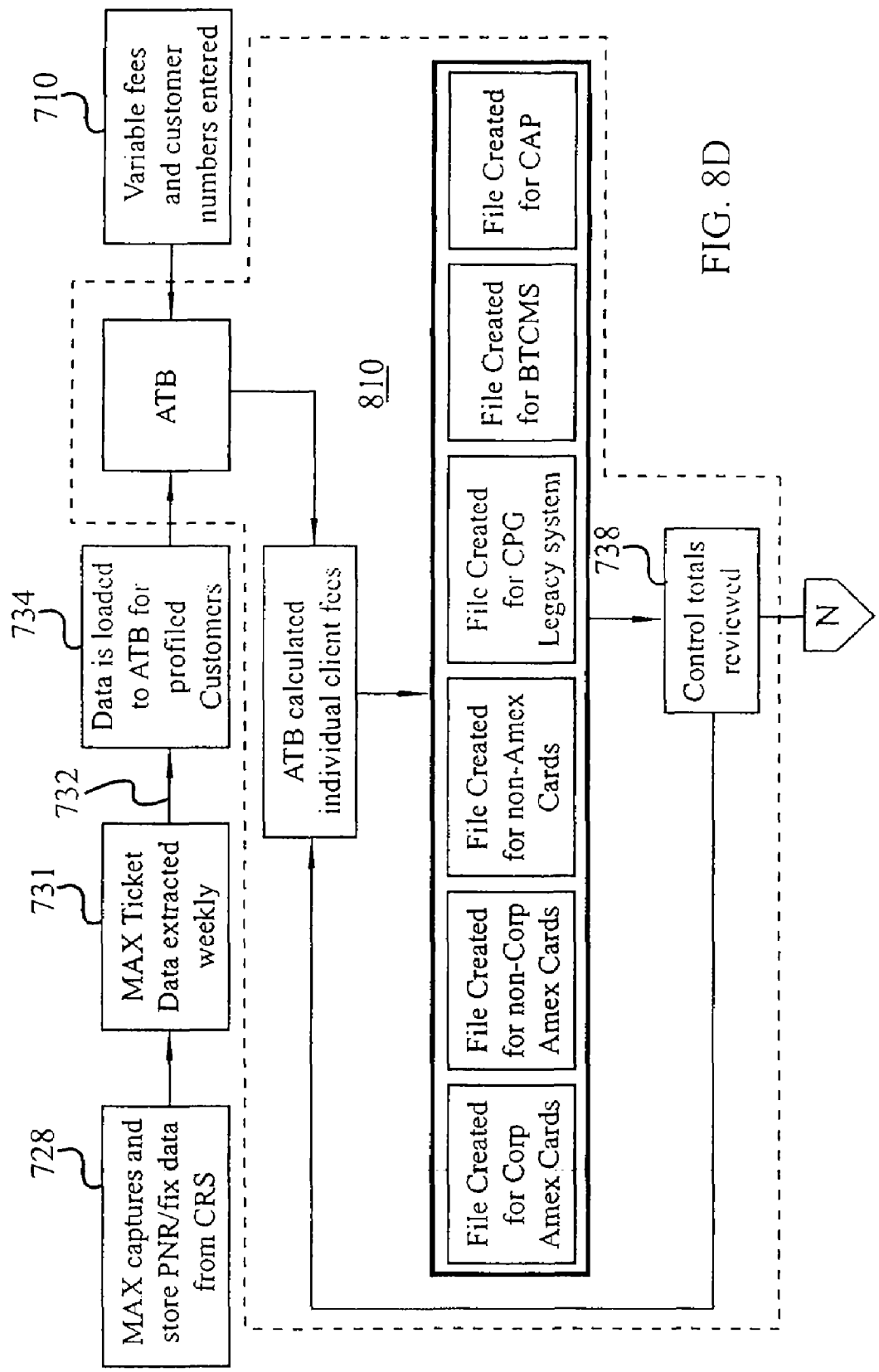
Figure 8E:
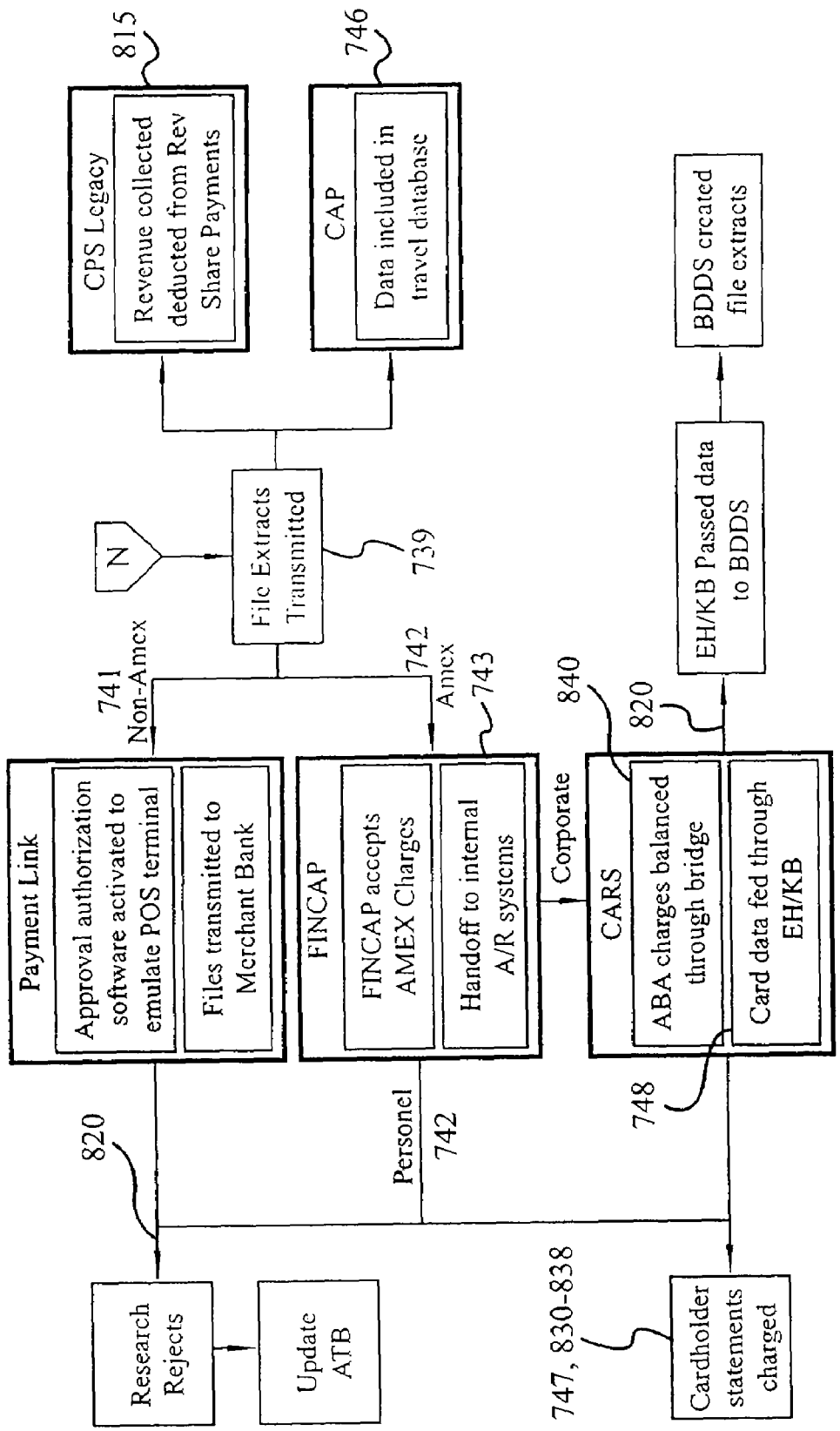

A bridge from the back office accounting system 730 (FIG. 8A) provides even more data on the ABA, which may be merged with data provided by CARS 748 in step 840 on FIG. 8B to provide enhanced billing detail as described below. The ABA product may, for example be available to American Express Travel and Card clients. FIGS. 8D & 8E show a further exemplary embodiment from an application architecture perspective where corresponding architecture has been identified with reference numbers from previous steps in other figures.

In one example, the fees may be charged daily or on the Friday of the next week, per the client's request. For weekly processing, there may be a 7-14 day difference between the date of the airline ticket charge and the date of the transaction fee charge. The fees charged by facilitating entity 110 may be counted towards a client's incentive program, frequent flier miles, reward points, and similar programs, as discussed above. The fee allocator system can bill to all accounts, or may be limited to work with only certain designated accounts.

When these fees are charged, reconciliation information is sent to the credit account. In one embodiment, the reconciliation information can be printed on the bills. In another embodiment, the fees and the travel related expenses can be sorted and grouped together on a report facilitating reconciliation of large numbers of fees and related expenses. This reconciliation information may include, for example, the ticket number, record locator, or date of the flight. More or less information may be provided as appropriate, as discussed below with reference to several example-billing statements.

For example, FIG. 3 shows an Enhanced Country Club Billing American Express Corporate Card Statement. For each transaction, a descriptive fee identifier (i.e. AMERICAN EXPRESS PAPER TICKET FEE, AMERICAN EXPRESS E-TICKET FEE, AMERICAN EXPRESS INTERACTIVE TICKET FEE, AMERICAN EXPRESS TICKET EXCHANGE FEE, AMERICAN EXPRESS TICKET REFUND FEE) 322, the 13-digit ticket number 324, passenger name 326, invoice date 328, routing 330 and transaction amount 332 are provided. Lines 310 and 320 show examples of two transactions displaying such information. In other embodiments, the routing 330 and invoice date 328 are not shown. Total new charges 340 are shown including the transaction fees amount 332.

FIGS. 4A and 4B show a portion of an Airline Billing Account (ABA) statement. In FIG. 4A, a summary page shows new charges 410 which include the transaction fees. In FIG. 4B, transaction fee 420 for the airline/rail tickets appears on the ABA statement. The transaction fees match to the reservation data and print all available transactional-level information: a descriptive transaction fee identifier (i.e. AMERICAN EXPRESS PAPER TICKET FEE, AMERICAN EXPRESS E-TICKET FEE, AMERICAN EXPRESS INTERACTIVE TICKET FEE, AMERICAN EXPRESS TICKET EXCHANGE FEE, AMERICAN EXPRESS TICKET REFUND FEE) 444, passenger name 446, routing 442, class 448, airline code 450, departure date 452, invoice number 454, invoice date 455, ticket number 456, American Express reference number 458, and transaction fee amount 420. In this embodiment, all related ticket charges and/or refunds and their corresponding transaction fees sort together so long as they are received in the same billing cycle (see reference 430). Each line represents a transaction 440.

In another embodiment, FIG. 5 shows a Business Travel Account (BTA). The BTA is similar to the ABA discussed with reference to FIGS. 4A and 4B, however, the BTA product does not produce a fully reconciled statement. Instead, a tape or diskette of the company's billing monthly transactions is sent to the travel agency to match the reservation data with the billing data. The transaction fee(s) appear on the BTA statement within the "ALL OTHER TRANSACTIONS DETAIL SECTION" 510. Here as in the previous examples, similar descriptive information is provided for each transaction (see 520 and 530). The transaction fees are totaled for each individual 540, and are collectively totaled on a separate section not shown.

A further embodiment, not shown, is an Airline Central Billing Diversion account statement. These are similar to the ABA and BTA discussed above, however, the diversion accounts are designed to be used in conjunction with American Express Corporate Cards and to charge the flight to the individual's Corporate Card and the fee to a central statement that goes to the individual's corporation. A large variety of fee types can be diverted, such as airline and rail fees and credits, car rental fees, card fees, and cash fees. Therefore, the individual Cardmember receives a bill similar to that shown in FIG. 3. The ticket charge may be shown, and the fee information may also be shown, but the fee amount has been diverted and may show as $0.00 indicating that the Cardmember is not responsible for that fee. The individual's corporation also receives a statement similar to those discussed above with reference to FIGS. 4 and 5, and the corporation is responsible for the fees diverted to it. On an ACCB, fee allocator fees related to refunded tickets can be automatically credited to a central billing account if desired.

To the extent that collaboration exists (i.e. they are affiliates, or owned by the same company) between the entity using the fee allocator program and the credit entity, it is possible to provide enhanced descriptive billing statements which are able to display more reconciliation information and to display such information in alternate formats. With regard to the creation of enhanced descriptive billing statements, the reconciliation information is provided to a billing system, which interprets the information, and then generates an enhanced billing statements such as the ABA discussed above.

To the extent that no collaboration exists between the entity using fee allocator and the credit entity, a more limited amount of reconciliation information can still be provided on the purchaser's billing statement. In this second embodiment, the charges for fees and reconciliation information may be sent out through Purchase Express, however, the reconciliation information may be restricted, for example, to 23 characters which might include any of the information discussed herein. In this embodiment, the recipient of the bill for the fees may be able to reconcile the fees to the travel related charge because included in the charge description line is the ticket number, record locator, date of the flight, or other such identifying data. FIGS. 6A-6C show exemplary itineraries with similar information as described above with regards to FIGS. 3 and 4, and showing a message 600 which in one example reads, "as per our agreement with your company you have been charged a non-refundable travel service fee of $XX.00. A travel service fee of $XX.00 will be charged for refunded tickets. . . . "

In another embodiment, a user can select an alternate billing display, such as with a partial enhanced descriptive billing statement or no enhanced descriptive billing statement, and the fee allocator system can be configured to provide less information for the billing statements, if, for example, a purchaser does not want to pay for the enhanced billing feature. In this embodiment, purchasing entity 120 does not get an enhanced descriptive billing statement, but does get billing and itinerary information facilitating reconciliation of fees with related service prices. Nevertheless, even a traveler using a non-affiliated credit entity can establish multiple accounts such that the fees are billed to the correct cost center, thus reducing the time and effort of manually redistributing those fees to specific corporate accounts.

By automatically and individually billing each fee to a traveler's credit account, lumped fee billing is avoided or minimized without any additional travel consultant intervention. Also, if requested in the user profile, fees may be automatically split between separate credit accounts without any additional travel counselor intervention. For example, a traveler may wish for half of the fee associated with a plane flight to be charged to his own account and half to be charged to a corporate travel account. Furthermore, it is possible to configure a user profile such that fees are charged to one credit account and the price of the ticket is charged to another account.

The automatic fee allocation process reduces the time consuming manual efforts of travel counselors at travel agencies involved with separately generating much of the PNR data, coordinating fee billing with client preferences, and manually billing the fees. The fee allocator program includes the flexibility for meeting client's billing and cost allocation process needs, streamlining administrative tasks, and reducing the number of service calls because the simplified expense reconciliation reporting mechanism causes less confusion.

In the prior art, a facilitating entity typically sent a bill to a purchasing entity on a monthly or quarterly basis, for example, and waited to receive payment back from purchasing entity 120. In the present invention, however, facilitating entity 110 may charge the fee to an account ("credit card") with credit entity 140. Thus, facilitating entity 110 no longer bears the risk of loss due to non-payment nor bears the loss of interest that could have been earned on that amount of money. Facilitating entity 110 is therefore able to enjoy an improved cash flow by replacing the quarterly settlement systems often used in the prior art with monthly payment. Unlike the airlines that have to wait for ARC validation of the charges they process, in an exemplary embodiment, the fee allocator system is not duplicative of another fee being charged and thus can readily process the fees.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A system for facilitating an automatic allocation of fees and costs associated with a travel-related transaction, said system having a network interface communicating with a memory, said memory communicating with a processor, said processor, when executing a computer program, is configured to:
    compare, by said processor, at least a portion of a Passenger Name Record to information in a user profile;
    identify, by said processor, an agency fee to be charged for assistance by a travel agency based on said comparison, wherein said user profile comprises allocation information, and wherein said allocation information defines said agency fee with a corresponding first billing account and a travel cost with a corresponding second billing account; and,
    charge, by said processor, said agency fee to said first billing account and said travel cost to said second billing account, according to said user profile.

2. The system of claim 1, wherein said Passenger Name Record is received from an accounting system.

3. The system of claim 1, further configured to provide an enhanced descriptive billing statement which recites said travel cost related to said travel-related transaction and separately recites said agency fee.

4. The system of claim 3, wherein said enhanced descriptive billing statement further recites indicia indicating that said agency fee and said travel cost are related to each other.

5. The system of claim 1, further configured to format said Passenger Name Record in a Passenger Name Record format.

6. The system of claim 1, wherein said first billing account comprises fee reconciling information.

7. The system of claim 1, further configured to provide a credit entity with fee reconciling information.

8. The system of claim 1, wherein said first billing account and said second billing account are associated with the same entity.

9. The system of claim 1, further configured to receive a subset of said Passenger Name Record from a management information system.

10. The system of claim 1, further configured to receive said Passenger Name Record from at least one of a travel system or a Computer Reservation System.

11. The system of claim 1, wherein said agency fee represents an extra charge related to said travel-related transaction in addition to said travel cost.

12. The system of claim 1, wherein said travel cost represents charges associated with said travel-related transaction.

13. The system of claim 1, wherein at least a portion of said agency fee includes loyalty points.

14. The system of claim 1, wherein at least a portion of said travel cost includes loyalty points.

15. The system of claim 1, wherein at least one of said first billing account or said second billing account comprises a plurality of billing accounts.

16. The system of claim 1, further configured to reducing at least one of said agency fee or said travel cost in response to said travel-related transaction being in accordance with predefined rules.

17. A computer-readable medium tangibly embodying a plurality of computer-executable instructions, that, if executed by a computer processor, cause said computer processor to perform a method comprising:
    comparing at least a portion of a Passenger Name Record to information in a user profile;
    identifying an agency fee to be charged for assistance by a travel agency based on said comparison, wherein said user profile comprises allocation information, and wherein said allocation information defines said agency fee with a corresponding first billing account and a travel cost with a corresponding second billing account; and,
    charging said agency fee to said first billing account and said travel cost to said second billing account, according to said user profile.

* * * * *